United States Patent
Donzis et al.

(10) Patent No.: US 6,717,918 B1
(45) Date of Patent: Apr. 6, 2004

(54) ISDN CALLBACK WITH INITIAL CALL REJECT

(75) Inventors: Lewis Donzis, San Antonio, TX (US); Jonathan Schmidt, San Antonio, TX (US); Howard Bahr, San Antonio, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/160,850

(22) Filed: Sep. 25, 1998

(51) Int. Cl.[7] .................. H04L 12/28; H04L 12/66; H04J 3/12
(52) U.S. Cl. ............... 370/254; 370/524; 370/352; 379/210.01
(58) Field of Search ................. 370/264, 401, 370/402, 400, 431, 466, 464, 467, 352, 395.2, 522, 524; 379/93.01, 210.01, 29.06, 82, 88.19, 219, 207.13, 142.01, 210.02, 211.02; 709/227, 228

(56) References Cited

U.S. PATENT DOCUMENTS

| | | | | |
|---|---|---|---|---|
| 5,602,846 A | * | 2/1997 | Holmquist et al. | 370/384 |
| 5,898,839 A | * | 4/1999 | Berteau | 395/200.57 |
| 6,055,510 A | * | 4/2000 | Henrick et al. | 705/14 |
| 6,415,027 B1 | * | 7/2002 | Malik | 379/221.01 |
| 6,459,783 B1 | * | 10/2002 | March et al. | 379/211.02 |

OTHER PUBLICATIONS

Gary C. Kessler, Chapter 7, The D–Channel Layer 3 Protocol, ISDN Second Edition, pp. 123–152, McGraw–Hill Series on Computer Communications.

* cited by examiner

*Primary Examiner*—Duc Ho
(74) *Attorney, Agent, or Firm*—Blakely Sokoloff Taylor & Zafman LLP

(57) ABSTRACT

A technique for processing a telephone call from a calling party without accepting the call and subsequently, in response, initiating a call to the calling party. Utilizing this technique on an ISDN connection in which a customer is connected to an Internet Service Provider, calls initiated by the Internet Service Provider will not be answered by the customer, but the customer will be alerted and, in response, will place a call to the Internet Service Provider.

19 Claims, 5 Drawing Sheets

ISDN CALLBACK WITH INITIAL CALL REJECT

BACKGROUND OF THE INVENTION

1. Field of the Invention

The present invention relates to the field of telecommunications and, more particularly, to communication connections over an ISDN line.

2. Background of the Related Art

In the field of telecommunications, the use of Integrated Services Digital Network (ISDN) is well known. In a typical connection, a user (also referenced as a terminal) is coupled to a serving ISDN for transfer of digital data employing an established protocol. For example, CCITT (Consultative Committee for International Telephone and Telegraph) Recommendation Q.931 (also referred to as the Q.931 specification or protocol) describes user-network messaging for basic call control. This and other protocol standards (such as the CCITT X.25 packet switching protocol) define the manner in which calls are handled and information transferred through an ISDN connection.

One widely used application of an ISDN is in connecting a digital computing device and/or digital information network to the Internet. It is generally known that an ISDN connection provides significant advantage over analog modem lines, mostly due to the faster data transfer rate achievable, as well as the additional connection messaging being transferred. It is also well known that the current configuration for ISDN Basic Rate Interface (BRI) utilizes one D-channel and two B-channels (2B+D). In FIG. 1, a typical ISDN connection to the Internet is illustrated.

In FIG. 1, a computer user (denoted as a customer) is shown coupled to the Internet. The customer can be a single user or a network of multiple users. Thus, block 10, designating the customer in FIG. 1, represents one or more than one computer or processing device, which is coupled to the Internet. Since in most instances, the customer does not have the access directly to the Internet, the customer typically subscribes with an Internet Service Provider (ISP) to obtain Internet access. Block 11 denotes the ISP, which has a connection onto the Internet. A variety of configurations are available for the customer to link to its ISP. Individual users may link by modem connections, but for multiple-user connections, ISDN provides for a much more enhanced solution. Accordingly, in FIG. 1, an ISDN connection is shown connecting the customer (block 10) to its ISP (block 11).

Although not shown, it is appreciated that the ISDN connection between the customer and the ISP generally is made through an exchange, which is typically provided by local telephone company. Also, in a typical configuration, a router (or a port) 12 is utilized by the customer to interface the ISDN line to a terminal or terminals. A similar arrangement is usually present at the ISP's end to allow multiple customers to access the Internet through the ISP.

In a typical customer-ISP connection to the Internet, the ISDN connection allows either the customer or the ISP to initiate the connection. Similar to a telephone call, the calling party initiates actions for contacting and connecting to the other party. For example, the customer would initiate an outbound call to the ISP to send an electronic message (e-mail) to a third party via the Internet. Alternatively, the customer may want access to the Internet to browse the World Wide Web. In these instances, the customer would initiate the call to the ISP using the ISDN, similar to using the telephone to call the ISP.

Likewise, when the ISP needs to contact the customer, the ISP will initiate the call. For example, when e-mail, destined to the customer, is received by the ISP, the ISP initiates a call to the customer for transferring the e-mail message. These aspects of transferring information between the customer and the ISP are well known.

FIG. 1 illustrates the situation when the ISP is calling the customer to initiate the connection. An incoming call from the ISP is received by the customer. The incoming call is typically processed by the router 12 and in which the router notices the incoming call. The router 12 then initiates a connect so that the connection between the customer and the ISP is complete. This action is analogous to a telephone caller calling a party and the receiving party picking up the handset of a telephone, upon hearing the ringing of the telephone, to complete the connection.

Unlike the ordinary telephone set, the sequence of events for an ISDN connection to complete the connection is more complicated. A detail for an ISDN connection is illustrated in FIG. 2. In order to show the signal flow, the central office or exchange, denoted as the telephone company (TelCo), is shown as block 13. It is appreciated that the connection can be made through a variety of communications networks available and that the call may transfer through more than one exchange or network.

In a sequence of signal flows shown in FIG. 2, a Setup signal or message is initiated when the ISP places a call to the customer. The Setup message includes information to the TelCo to establish the call. The Setup message includes information regarding the called party, as well as information for configuring which B-channel is to be selected for the communication. Sometimes a Setup Acknowledge message is issued by the TelCo to resend (duplicate) the original information or ask for further information. When requested, the caller responds with the information. When the TelCo has all of the necessary information, a Call Proceeding message is issued to the caller notifying the caller that the service request is valid and that the call setup is in progress.

The TelCo then sends its Setup message to the called party, which is the customer in the example shown. This Setup message is not the same Setup message from the ISP, but essentially contains similar content to establish the call. Upon receiving the Setup message, the called party (customer) sends a Call Proceeding message to the TelCo to inform that the call request has been received. Then the called party issues an Alerting message to alert the user that there is an incoming call. When the TelCo receives the Alerting message, it then sends its Alerting message to the caller that the called party is being alerted.

When the called party's terminal accepts the call, a Connect message is issued to the TelCo and the TelCo further issues a Connect message to the caller. Also, upon receiving the Connect message from the called party, the TelCo issues a Connect Acknowledge message back to the called party. Likewise, a Connect Acknowledge message is initiated by the caller when it receives the connect message from the TelCo. At this point, connection is established between the ISP and the customer and the call is now in the call information phase. If the call is initiated by the customer, to the ISP, the message flow above is repeated, but in this instance the customer is the calling party and the ISP is the called party.

Referring to FIG. 3, it illustrates an example disconnection from an established call connection. In this instance, the party desiring to disconnect initiates a Disconnect message. In the example shown, the customer initiates the Disconnect. The TelCo, upon receiving the Disconnect, issues its Disconnect to the other party. A corresponding Release message is then issued in response by the TelCo and the disconnected party upon receiving the Disconnect message. Upon receiving the Release message, the customer sends a Release Complete message to signal the TelCo to release the B-channel assigned to the customer. Finally, a Release Complete is sent to the ISP to notify the disconnect process is completed.

The above sequence of messages and events for establishing an ISDN connection and disconnecting from it are known. See for example, "ISDN" by Gary C. Kessler; and specifically, Chapter 7, at pp. 123–152, titled "The D-channel Layer 3 Protocol;" McGraw-Hill; 1990, 1993.

Although ISDN allows for an enhanced communication link, the calling scheme is still patterned as a telephone call from a calling party to a called party. That is, a call is made from a party who needs to connect with another party. When a given call is initiated, the sequence of events shown in FIG. 2 occurs until the connection is made (or the caller disconnects). In the particular example described above, the router 12 of FIG. 1 identifies the incoming call and initiates the connection by issuing a Connect signal. This action establishes a connection and at this point a physical connection is noted and appropriate charges, fees, tariffs are incurred. However, there are instances, where it would be beneficial for one party and/or the other not to complete the connection, but instead signal to the other party to place a return call to the original calling party. One such example is the communication link between an ISP and its customer.

The present invention describes a scheme in which such a return call can be completed without completing the original call.

SUMMARY OF THE INVENTION

The present invention describes a technique to process a telephone call from a calling party without accepting the call and subsequently initiating a call to the original calling party or a pre-designated party. An incoming telephone signal is received to commence establishing a communication link with the calling party. The incoming telephone signal may include information which identifies the calling party's identity. The incoming call from the calling party is prohibited from initiating a connection to establish the communication link.

Instead, the attempt to establish the communication link by the calling party is terminated, for example, by an initiation of a disconnect message. The call from the calling party fails to complete the connection. Then, a call is initiated to the original calling party or to a pre-designated party to establish the communication link in response to the calling party's earlier attempt to establish the communication link.

Utilizing this technique on an ISDN connection in which a customer is connected to an Internet Service Provider, calls initiated by the Internet Service Provider will not be answered by the customer, but the customer will be alerted and, in response, will place a call to the Internet Service Provider.

DETAILED DESCRIPTION OF THE INVENTION

Figure 1:
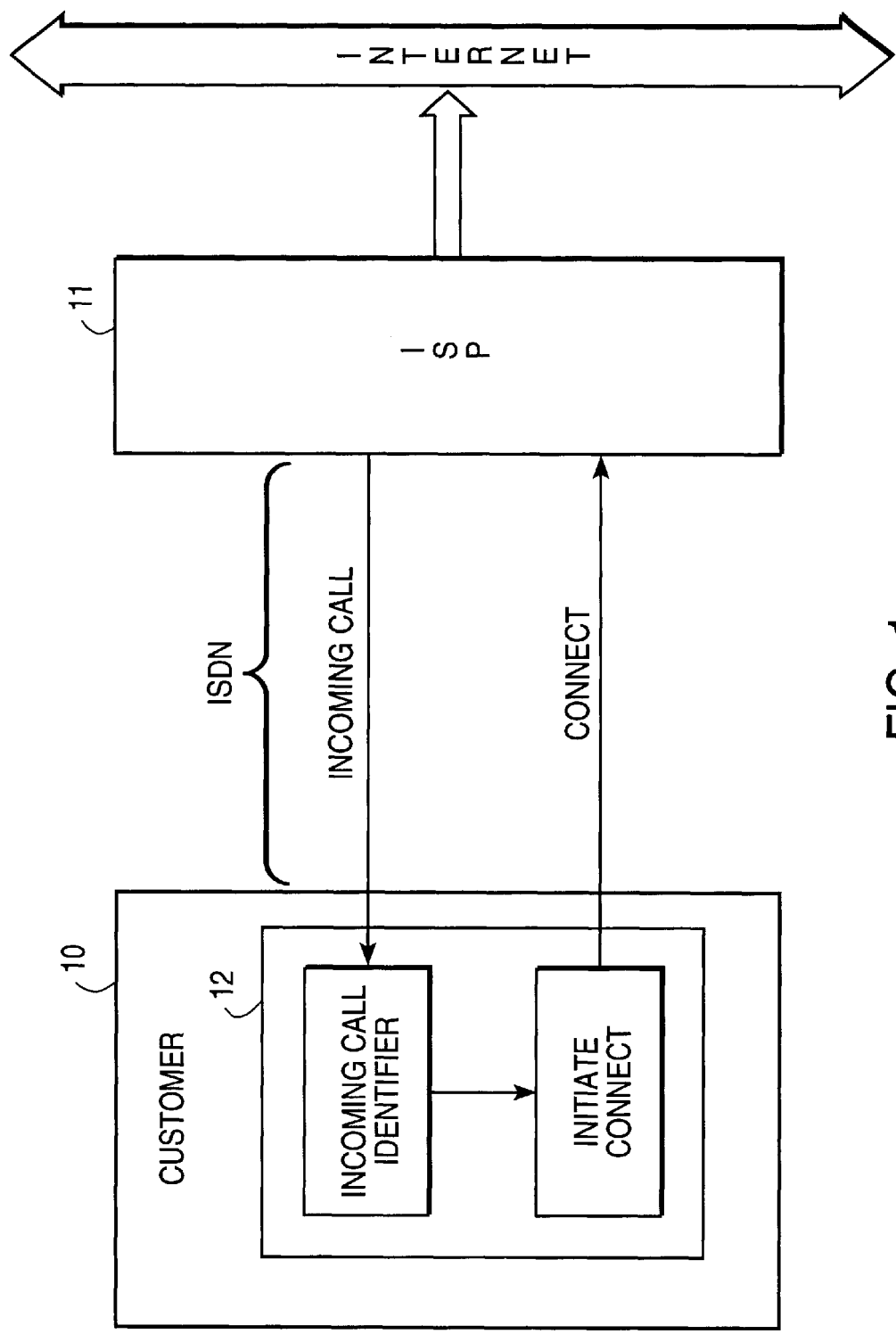
FIG. 1 is block diagram showing an ISDN communication link between an Internet Service Provider and its customer in which prior art practices require the customer to answer a call from the Internet Service Provider when a call is initiated by the Internet Service Provider.
Figure 2:
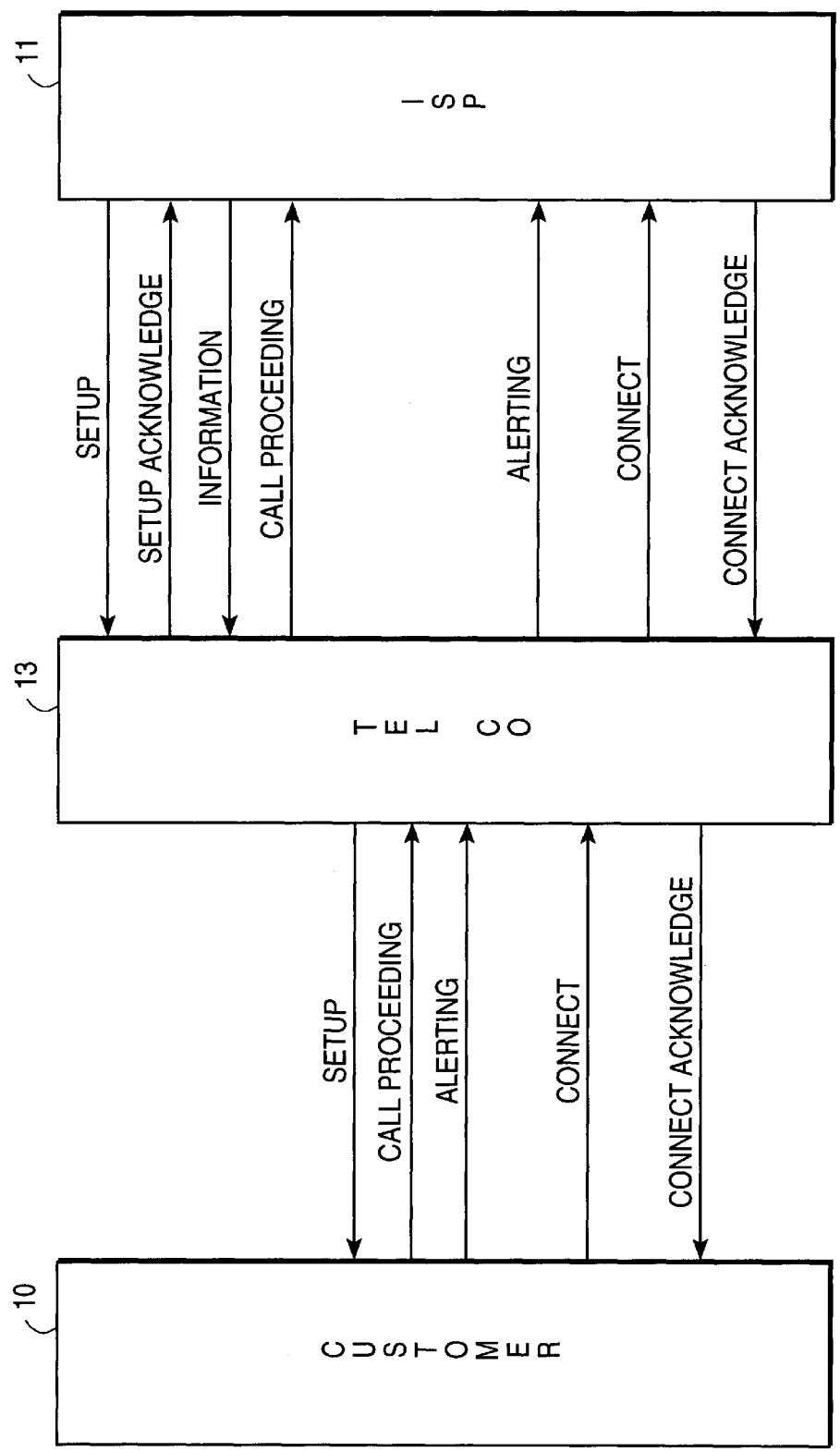
FIG. 2 shows a prior art message flow when the ISDN communication link of FIG. 1 utilizes the CCITT Q.931 protocol to establish an ISDN connection when a call is initiated by the Internet Service Provider of FIG. 1.
Figure 4:
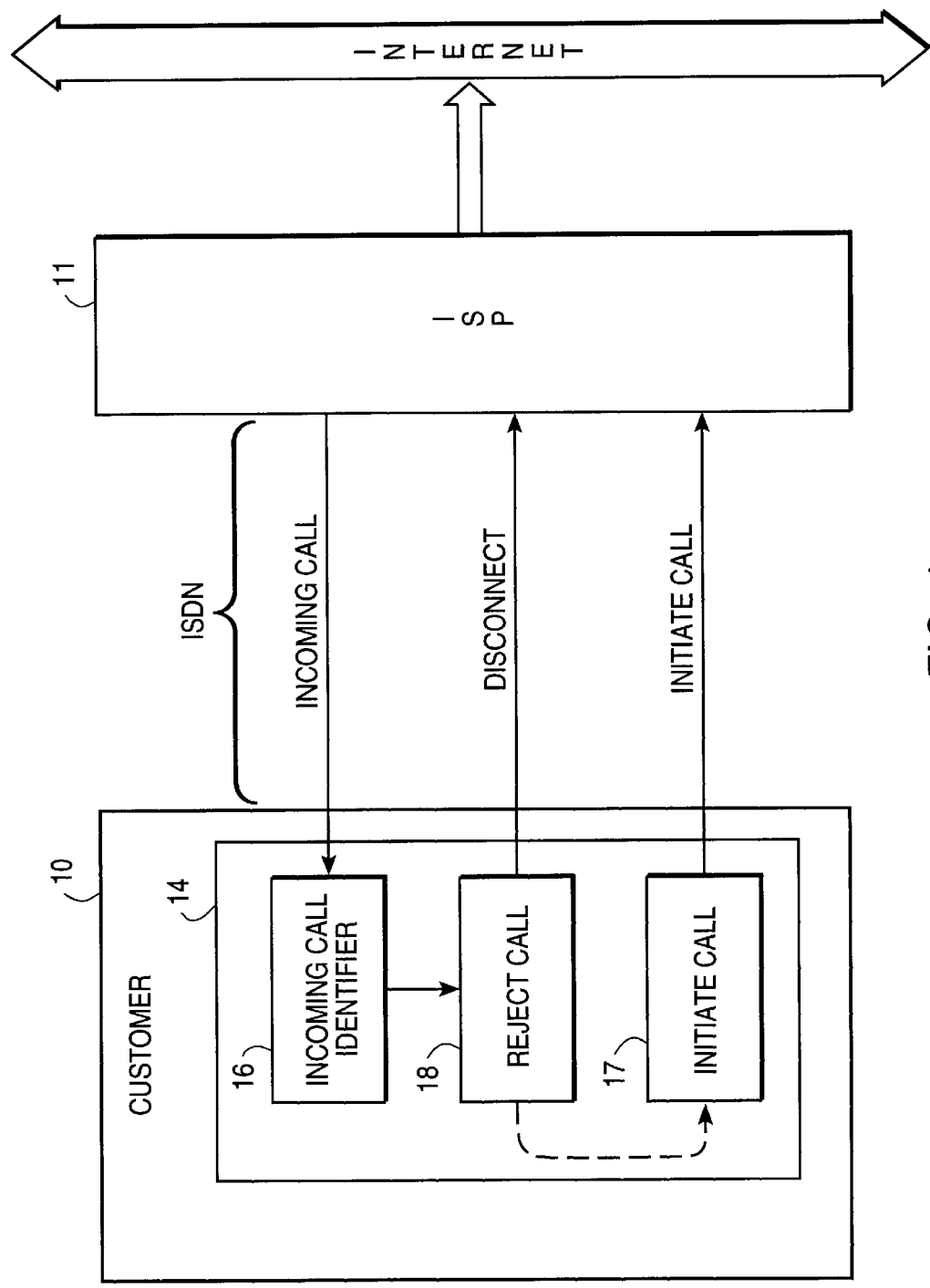
FIG. 4 shows a block diagram showing an ISDN communication link between an Internet Service Provider and its customer, in which the present invention is utilized to prevent a connection when a call originates from the Internet Service Provider, but in which a new call is initiated by the customer to call the Internet Service Provider to establish the connection earlier attempted and disconnected.

Referring to FIG. 4, a technique of the present invention is diagramed in the environment described in reference to FIG. 1. Thus, the customer is shown in block 10 coupled to the ISP in block 11 for access to the Internet. An ISDN connection is established between the customer and the ISP through one or more networks. Typically, in a local setting, the connection is established through the local telephone company (TelCo), as described previously. However, the customer now has a new router (or port or other processing device) 14, which implements the present invention. An incoming call from the ISP is processed and the incoming attempt to connect with the customer is noted when the setup message is received. However, instead of accepting the call, a Disconnect message is issued back to the TelCo to disconnect the attempted connection. The Disconnect message is issued without first issuing a Connect message. Thus, the call from the ISP is never completed and is regarded as an incomplete call.

Figure 5:
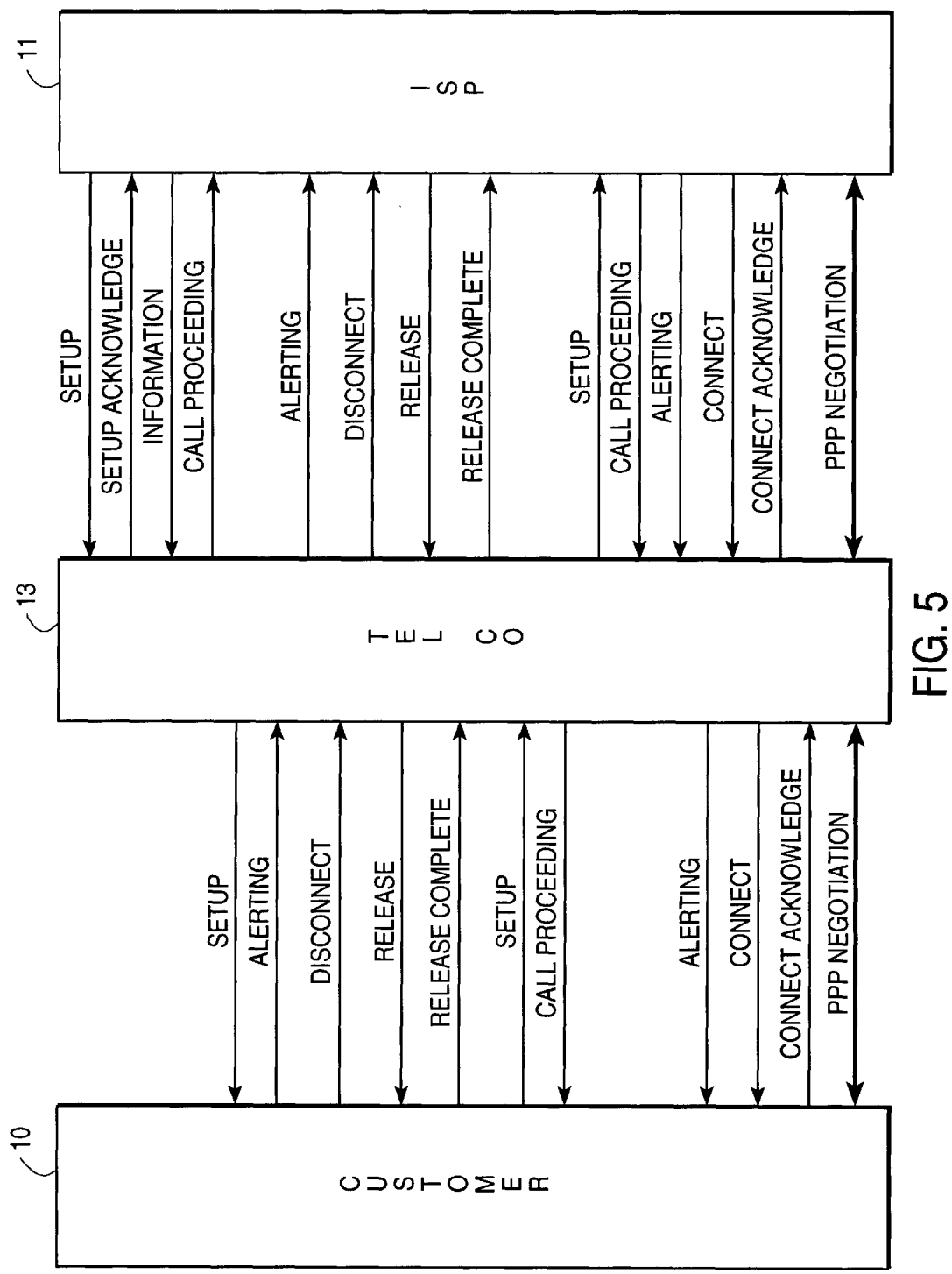
FIG. 5 shows one example of a message flow when the ISDN communication link employs the present invention as practiced in FIG. 4.

The router 14 initiates its own call to the ISP, after noting the attempted, but failed, communication. The sequence of signals and events for performing the disconnect and call back is illustrated in FIG. 5. In FIG. 5, the ISP first initiates the call to the customer over the ISDN connection. The Setup, Setup Acknowledge, Information and call Proceeding messages are generated between the ISP and the TelCo as previously described in the Background section above. A Setup signal from the TelCo is issued to the customer also as previously described. The customer issues the Alerting message to notify the TelCo and the ISP that the terminal is being alerted.

Figure 3:
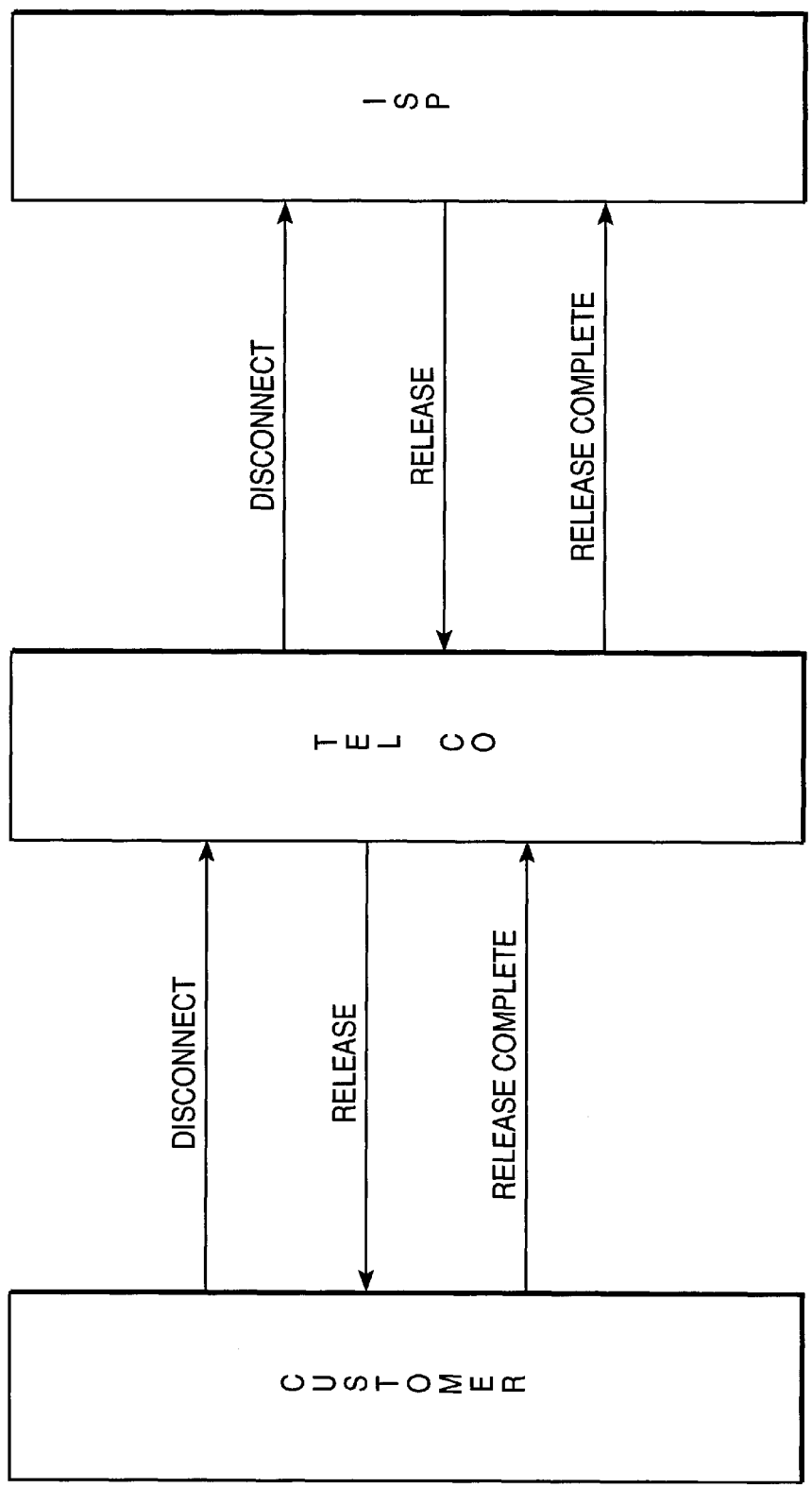
FIG. 3 shows a prior art message flow when the ISDN communication link of FIG. 1 utilizes the CCITT Q.931 protocol to disconnect an established ISDN connection.

However, at this point, the router 14 (of FIG. 4) has noted the Setup message, which may contain information to identify the calling party as the ISP. The router 14 has been instructed not to accept the call. The call from the ISP is rejected and the router issues a Disconnect message. The Disconnect, Release and Release complete messages are sequenced between the customer and TelCo and between the TelCo and the ISP, pursuant to the sequence described for these signals in FIG. 3. For purposes of recording the attempted connection by the network(s) between the ISP and the customer, it never occurred. That is, the call from the ISP was never completed.

The router 14 now knows that a call was attempted and when caller identification information is included in the Setup message, knows that the caller was the ISP. The router 14 now initiates a call to the ISP, so that the customer is now the calling party. The Setup, Call Proceeding and Alerting messages are initiated in the previously described sequence, but now having the customer in the position of the calling party. Note that the Setup Acknowledge and Information messages are not shown, but could be utilized here, if needed.

The ISP responds to this call by initiating a Connect message to accept the call and complete the connection, as though it is a normal request from the customer to access the Internet. After acknowledging the connection by issuing the requisite Connect acknowledge signals, the ISDN connection is established between the customer and the ISP to effect communication. A typical connection is a Point-To-Point (PPP) protocol to access the Internet. Thus, PPP negotiation is shown established between the customer and the ISP in FIG. 5.

It is to be appreciated that a variety of mechanisms can be put into practice to reject the incoming call and then calling back a pre-designated party or the original calling party (if the identity is known). The preferred technique (the preferred embodiment) is to program the router firmware to provide the sequence of identifying an incoming call (whether the caller's identity is known or not known), rejecting the call and then calling back the ISP. The ISDN protocol, such as the Q.931 protocol, allows the receiving party to identify the caller prior to accepting the call (if such information is provided in the Setup message). Caller identification (Caller ID) is available if the TelCo provides such information in the Setup message. Depending on the TelCo, the customer may need to subscribe for caller identification as an added service feature.

However, whether the identity of the caller is noted or not, the incoming call is not answered by a Connect message. Instead, the Disconnect message is issued. The called party (the customer, in the example) can now call back the original calling party (if the caller's identity is known and it is that of the ISP) or a pre-selected number (for example, the ISP's) in response to any incoming call when caller identification is not present.

Thus, the router 14 of the present invention is configured as a typical router for interfacing with a communication link (for example, phone lines) connected to an ISDN. The router includes a receiver for receiving an incoming call (shown by block 16 in FIG. 4) and a dialer (shown by block 17) for initiating a call. A processor or equivalent processing device (shown by block 18) includes the required programming for performing the present invention.

The processor can be programmed to identify particular numbers for rejection or it can reject all incoming numbers. The particular configuration for rejection of incoming attempts to connect will depend on the information provided in the Setup message received by the receiver 16. If the caller's identity is provided in the Setup message, then the programming can be setup to answer the call with a Connect if the caller's identification is not on a pre-selected list. In the example, the ISP would be on this list and a comparison of the caller's identity to one on the list would authorize the rejection and the calling back to the ISP. That is, when the incoming caller's identification is on the list (such as the ISP), the present invention is utilized to reject the incoming call and then the call is returned to the original calling party on the list.

Since many ISDN connections are dedicated connections for use strictly between the ISP and the customer, it may be desirable to only connect with the ISP. In that instance, the above procedure would be modified, so that all incoming calls are rejected and only those identities on the pre-selected list are returned by the customer. By placing only the ISP on this list, the system will only respond to attempts by the ISP to connect. Thus, in this instance, the router 14 will not connect with any incoming call and return only those calls originating from the ISP.

It is also appreciated that in many instances, caller identification is not provided in the incoming Setup message. In this instance, the programming is set to reject all incoming calls and to call the ISP in response to the incoming call attempt. Since the receiving unit cannot distinguish between the ISP and any other caller, the system is configured to assume that the call was from the ISP.

Thus, the present invention can be configured in a number of ways. The rejection selection can be programmed to be performed by the customer, ISP and/or any other party. The calling back would be performed automatically. It is also appreciated that devices, other than routers, can be utilized to practice the present invention. What is desired is for the incoming call to be identified and the caller's identity also identified (if the caller's identification is provided in the Setup message), rejected (if designated for rejection) and then the initiation of a call to the ISP. Utilizing this technique on an ISDN connection in which a customer is connected to an Internet Service Provider, calls initiated by the ISP will not be answered by the customer, but the customer will be alerted and, in response, will place a call to the ISP.

Appendix A lists a series of captured ISDN call signaling to illustrate one example practice of the present invention. Each of the ISDN frames identify the data associated with a particular ISDN signaling message included in FIG. 5.

There are a number of advantages in applying the present invention in the current telecommunications environment. The advantages are described in reference to the customer-ISP example described above. It is known that certain cost and tariff schedules impose higher fees for 2-way communication. For example, it is prevalent practice to impose much higher fees for outbound calls than for inbound calls. A prevalent practice by communication companies is to offer two way ISDN service at one price, but inbound only service at a significantly less cost. A sizeable surcharge is imposed if a call is initiated from an inbound only service. By utilizing the present invention, the ISP can configure its ISDN services with the communication company for inbound only. Whenever an outbound message is necessary, the invention would allow the ISP to notify its customer to call the ISP. A call from the ISP to the customer is never completed and, therefore, the ISP is not assessed the outbound call. Thus, any costs associated with outbound calls are not incurred by the ISP.

The ISP also benefits from mutual compensation paid by phone companies to exchanges. Providing that the ISP is established as an exchange, it will earn revenue on each incoming call. By utilizing the invention, all calls between the ISP and the customer will become revenue generating inbound calls to the ISP. Furthermore, the ISP can reduce the back bill to its customers. Current practice for many ISPs is to record outbound calls to its separate customers and back billing the customers for these charges. The bookkeeping adds significant overhead cost to an ISP. By removing outbound calls to its customers by the practice of the present invention, the customer would be assessed these charges.

Thus, the invention would allow the ISP to signal the customer when it needs to reach the customer, however, the attempted call from the ISP would not be completed. Instead, the customer would call the ISP back for whatever reason the ISP needed to contact the customer. The call would be initiated and completed by the customer.

APPENDIX A
ISDN CALL SIGNALING

Frame 1

SUMMARY Delta T   Destination Source   Summary
M    1       DTE.ISDN.03   DCE.ISDN.03   ISDN Setup Unrestricted digital B1
Called = 1111111
ISDN: ----- ISDN Call Control (National ISDN Basic Rate) -----
ISDN:
ISDN: Protocol discriminator = 08 (Q.931 user-network call control messages)
ISDN: Length of call reference = 1 byte
ISDN: Call reference field = 03
ISDN:      0... .... = Message from call reference originator
ISDN:      .000 0011 = Call reference value = 03
ISDN: Message type = 05 (Setup)
ISDN:
ISDN: Info element id = 04 (Bearer capability)
ISDN: Length of information element = 2 byte(s)
ISDN: Octet 3 value = 88
ISDN:      1... .... = Extension bit
ISDN:      .00. .... = Coding standard (CCITT)
ISDN:      ...0 1000 = Information transfer capability (Unrestricted digital)
ISDN: Octet 4 value = 90
ISDN:      1... .... = Extension bit
ISDN:      .00. .... = Transfer mode (Circuit mode)
ISDN:      ...1 0000 = Information transfer rate (64 kbit/s)
ISDN:
ISDN: Info element id = 18 (Channel identification)
ISDN: Length of information element = 1 byte(s)
ISDN: Octet 3 value = 89
ISDN:      1... .... = Extension bit
ISDN:      .0.. .... = Interface implicitly identified
ISDN:      ..0. .... = Basic interface
ISDN:      .... 1... = Only the indicated channel is acceptable
ISDN:      .... .0.. = Not the D-channel
ISDN:      .... ..01 = information channel selection (B1 channel)
ISDN:
ISDN: Info element id = 34 (Signal)
ISDN: Length of information element = 1 byte(s)
ISDN: Octet 3 value = 40
ISDN:      0100 0000 = Signal value (Alerting on - pattern 0)
ISDN:
ISDN: Info element id = 70 (Called party number)
ISDN: Length of information element = 8 byte(s)
ISDN: Octet 3 value = C1
ISDN:      1... .... = Extension bit
ISDN:      .100 .... = Type of number (Subscriber number)
ISDN:      .... 0001 = Numbering plan (ISDN/telephony (E.164))
ISDN: Number digits = "1111111"
ISDN:
ISDN: Info element id = 95 (Shift)
ISDN: Shift = X5
ISDN: .... 0... = Locking shift
ISDN: .... .101 = Codeset (National use information elements)
ISDN:
ISDN: Info element id = 2A (National use: Display text)
ISDN: Length of information element = 10 byte(s)
ISDN: Octet 3 value = 80
ISDN:      1... .... = Extension bit
ISDN:      .000 0000 = Display type (Normal)
ISDN: Display tag = 0 (Blank)
ISDN: Display count = 3
ISDN: Display tag = 0 (Blank)
ISDN: Display count = 17
ISDN: Display tag = 0 (Blank)
ISDN: Display count = 60
ISDN:

Frame 2

SUMMARY Delta T   Destination Source   Summary
2   0.0000 DCE.ISDN.03   DTE.ISDN.03   ISDN Alerting B1
ISDN: ----- ISDN Call Control (National ISDN Basic Rate) -----
ISDN:
ISDN: Protocol discriminator = 08 (Q.931 user-network call control messages)
ISDN: Length of call reference = 1 byte
ISDN: Call reference field = 83
ISDN:      1... .... = Message to call reference originator
ISDN:      .000 0011 = Call reference value = 03

-continued

APPENDIX A
ISDN CALL SIGNALING

ISDN: Message type = 01 (Alerting)
ISDN:
ISDN: Info element id = 18 (Channel identification)
ISDN: Length of information element = 1 byte(s)
ISDN: Octet 3 value = 89
ISDN:     1... .... = Extension bit
ISDN:     .0.. .... = Interface implicitly identified
ISDN:     ..0. .... = Basic interface
ISDN:     .... 1... = Only the indicated channel is acceptable
ISDN:     .... .0.. = Not the D-channel
ISDN:     .... ..01 = Information channel selection (B1 channel)
ISDN:

Frame 4

SUMMARY Delta T   Destination Source   Summary
4    0.0356 DCE.ISDN.03   DTE.ISDN.03   ISDN Disconnect Normal call clearing
ISDN: ----- ISDN Call Control (National ISDN Basic Rate) -----
ISDN:
ISDN: Protocol discriminator = 08 (Q.931 user-network call control messages)
ISDN: Length of call reference = 1 byte
ISDN: Call reference field = 83
ISDN:     1... .... = Message to call reference originator
ISDN:     .000 0011 = Call reference value = 03
ISDN: Message type = 45 (Disconnect)
ISDN:
ISDN: Info element id = 08 (Cause)
ISDN: Length of information element = 2 byte(s)
ISDN: Octet 3 value = 80
ISDN:     1... .... = Extension bit
ISDN:     .00. .... = Coding standard (CCITT)
ISDN:     .... 0000 = Location (User)
ISDN: Octet 4 value = 90
ISDN:     1... .... = Extension bit
ISDN:     .001 .... = Class (Normal event)
ISDN:     .001 0000 = Cause = 16 (Normal call clearing)
ISDN:

Frame 6

SUMMARY Delta T   Destination Source   Summary
6    0.0319 DTE.ISDN.03   DCE.ISDN.03   ISDN Release
ISDN: ----- ISDN Call Control (National ISDN Basic Rate) -----
ISDN:
ISDN: Protocol discriminator = 08 (Q.931 user-network call control messages)
ISDN: Length of call reference = 1 byte
ISDN: Call reference field = 03
ISDN:     0... .... = Message from call reference originator
ISDN:     .000 0011 = Call reference value = 03
ISDN: Message type = 4D (Release)
ISDN:
ISDN: Info element id = 34 (Signal)
ISDN: Length of information element = 1 byte(s)
ISDN: Octet 3 value = 4F
ISDN:     0100 1111 = Signal value (Alerting off)
ISDN:
ISDN: Info element id = 95 (Shift)
ISDN: Shift = X5
ISDN: .... 0... = Locking shift
ISDN: .... .101 = Codeset (National use information elements)
ISDN:
ISDN: Info element id = 2A (National use: Display text)
ISDN: Length of information element = 4 byte(s)
ISDN: Octet 3 value = 80
ISDN:     1... .... = Extension bit
ISDN:     .000 0000 = Display type (Normal)
ISDN: Display tag = 0 (Blank)
ISDN: Display count = 80
ISDN:

Frame 8

SUMMARY Delta T   Destination Source   Summary
8    0.0000 DCE.ISDN.03   DTE.ISDN.03   ISDN Release complete
ISDN: ----- ISDN Call Control (National ISDN Basic Rate) -----
ISDN:
ISDN: Protocol discriminator = 08 (Q.931 user-network call control messages)
ISDN: Length of call reference = 1 byte -continued

APPENDIX A
ISDN CALL SIGNALING

ISDN: Call reference field = 83
ISDN:     1... .... = Message to call reference originator
ISDN:     .000 0011 = Call reference value = 03
ISDN: Message type = 5A (Release complete)
ISDN:

Frame 10

SUMMARY Delta T   Destination Source   Summary
10   2.0234 DCE.ISDN.01   DTE.ISDN.01   ISDN Setup Unrestricted digital
Any Called = 2222222
ISDN: ----- ISDN Call Control (National ISDN Basic Rate) -----
ISDN:
ISDN: Protocol discriminator = 08 (Q.931 user-network call control messages)
ISDN: Length of call reference = 1 byte
ISDN: Call reference field = 01
ISDN:     0... .... = Message from call reference originator
ISDN:     .000 0001 = Call reference value = 01
ISDN: Message type = 05 (Setup)
ISDN:
ISDN: Info element id = 04 (Bearer capability)
ISDN: Length of information element = 2 byte(s)
ISDN: Octet 3 value = 88
ISDN:     1... .... = Extension bit
ISDN:     .00. ... = Coding standard (CCITT)
ISDN:     ...0 1000 = Information transfer capability (Unrestricted digital)
ISDN: Octet 4 value = 90
ISDN:     1... .... = Extension bit
ISDN:     .00. .... = Transfer mode (Circuit mode)
ISDN:     ...1 0000 = Information transfer rate (64 kbit/s)
ISDN:
ISDN: Info element id = 18 (Channel identification)
ISDN: Length of information element = 1 byte(s)
ISDN: Octet 3 value = 83
ISDN:     1... .... = Extension bit
ISDN:     .0.. .... = Interface implicitly identified
ISDN:     ..0. .... = Basic interface
ISDN:     .... 0... = Indicated channel is preferred
ISDN:     .... .0.. = Not the D-channel
ISDN:     .... ..11 = Information channel selection (Any channel)
ISDN:
ISDN: Info element id = 70 (Called party number)
ISDN: Length of information element = 8 byte(s)
ISDN: Octet 3 value = 80
ISDN:     1... .... = Extension bit
ISDN:     .000 .... = Type of number (Unknown)
ISDN:     .... 0000 = Numbering plan (Unknown)
ISDN: Number digits = "2222222"
ISDN:

Frame 12

SUMMARY Delta T   Destination Source   Summary
12   0.5231 DTE.ISDN.01   DCE.ISDN.01   ISDN Call proceeding B1
ISDN: ----- ISDN Call Control (National ISDN Basic Rate) -----
ISDN:
ISDN: Protocol discriminator = 08 (Q.931 user-network call control messages)
ISDN: Length of call reference = 1 byte
ISDN: Call reference field = 81
ISDN:     1... .... = Message to call reference originator
ISDN:     .000 0001 = Call reference value = 01
ISDN: Message type = 02 (Call proceeding)
ISDN:
ISDN: Info element id = 18 (Channel identification)
ISDN: Length of information element = 1 byte(s)
ISDN: Octet 3 value = 89
ISDN:     1... .... = Extension bit
ISDN:     .0.. .... = Interface implicitly identified
ISDN:     ..0. .... = Basic interface
ISDN:     .... 1... = Only the indicated channel is acceptable
ISDN:     .... .0.. = Not the D-channel
ISDN:     .... ..01 = Information channel selection (B1 channel)
ISDN:

Frame 14

SUMMARY Delta T   Destination Source   Summary
14   0.5572 DTE.ISDN.01   DCE.ISDN.01   ISDN Alerting
ISDN: ----- ISDN Call Control (National ISDN Basic Rate) -----

-continued

APPENDIX A
ISDN CALL SIGNALING

ISDN:
ISDN: Protocol discriminator = 08 (Q.931 user-network call control messages)
ISDN: Length of call reference = 1 byte
ISDN: Call reference field = 81
ISDN:       1... .... = Message to call reference originator
ISDN:       .000 0001 = Call reference value = 01
ISDN: Message type = 01 (Alerting)
ISDN:
ISDN: Info element id = 34 (Signal)
ISDN: Length of information element = 1 byte(s)
ISDN: Octet 3 value = 01
ISDN:       0000 0001 = Signal value (Ring back tone on)
ISDN:

Frame 16

SUMMARY Delta T   Destination Source   Summary
16   0.1368 DTE.ISDN.01   DCE.ISDN.01   ISDN Connect
ISDN: ----- ISDN Call Control (National ISDN Basic Rate) -----
ISDN:
ISDN: Protocol discriminator = 08 (Q.931 user-network call control messages)
ISDN: Length of call reference = 1 byte
ISDN: Call reference field = 81
ISDN:       1... .... = Message to call reference originator
ISDN:       .000 0001 = Call reference value = 01
ISDN: Message type = 07 (Connect)
ISDN:
ISDN: Info element id = 34 (Signal)
ISDN: Length of information element = 1 byte(s)
ISDN: Octet 3 value = 3F
ISDN:       0011 1111 = Signal value (Tones off)
ISDN:

Frame 18

SUMMARY Delta T   Destination Source   Summary
18   0.0000 DCE.ISDN.01   DTE.ISDN.01   ISDN Connect acknowledge
ISDN: ----- ISDN Call Control (National ISDN Basic Rate) -----
ISDN:
ISDN: Protocol discriminator = 08 (Q.931 user-network call control messages)
ISDN: Length of call reference = 1 byte
ISDN: Call reference field = 01
ISDN:       0... .... = Message from call reference originator
ISDN:       .000 0001 = Call reference value = 01
ISDN: Message type = 0F (Connect acknowledge)
ISDN:

We claim:

1. A method of processing a call from a calling party without accepting the call and subsequently initiating a call, comprising:

receiving an incoming telephone signal to commence establishing a communication link with the calling party being an Internet Service Provider, the incoming signal attemptinc a connection from the Internet Service Provider providing access to the Internet;

terminating an attempt to establish the communication link by the calling party; and automatically initiating a call by a processing device to the calling party to establish the communication link with the calling party for access to the Internet in response to the calling party's earlier attempt to establish the communication link.

2. The method of claim 1 wherein said receiving of the incoming signal further includes receiving a digital message identifying the calling party's identity and identifying the calling party's identity to determine if connection to establish a communication link is permitted prior to initiating the call to the calling party.

3. The method of claim 1 wherein said terminating also includes initiating a disconnect signal to disconnect the attempt to communicate by the calling party.

4. A method of processing a call from a calling party on a digital network without accepting the call and subsequently initiating a call to the calling party in response to an attempt by the calling party to establish a digital network connection, comprising:

receiving an incoming signal to commence establishing the digital network connection with the calling party being an Internet Service Provider providing access to the Internet;

initiating a disconnect signal to terminate the attempt to establish the digital network connection by the calling party;

initiating a call to the calling party to establish the digital network connection with the calling party in response to the calling party's earlier attempt to establish the digital network connection, the initiating of the call to the calling party is automatic without human intervention and includes initiating the call to connect to the calling party for access to the Internet.

5. The method of claim 4 wherein said receiving of the incoming signal, initiating the disconnect signal and initiating the call to the calling party include following a protocol determnnined by a CCITT Q.931 protocol.

6. In an Integrated Services Digital Network, ISDN, where a processing apparatus is coupled to the ISDN for transfer of digital information, a processing a call from a calling party without accepting the call and subsequently initiating a call to the calling party in response to an attempt by the calling party to establish the ISDN connection, comprising:

receiving an incoming setup message to commence establishing the ISDN connection with the calling party;

initiating a disconnect message to terminate the attempt to establish the ISDN connection by the calling party;

initiating a new setup message to call the calling party to establish the ISDN connection with the calling party in response to the calling party's earlier attempt to establish the ISDN connection, the initiating of the new set up message is automatic by the processing apparatus; and establishing the ISDN connection when the calling party responds to the new setup message with a connect message.

7. The method of claim 6 wherein said receiving of the incoming setup message, initiating the disconnect and new setup messages are performed by following a protocol determined by a CCITT Q.931 protocol.

8. The method of claim 7 wherein said receiving of the incoming setup message includes receiving the message to attempt a connection from an Internet Service Provider, who provides access to the Internet; and said initiating of the new setup message includes initiating the message to connect to the Internet Service Provider for access to the Internet.

9. The method of claim 7 wherein said receiving of the incoming setup message further includes receiving a digital message which identifies the calling party's identity; said identifying includes identifying the calling party as an Internet Service Provider, who provides access to the Internet; and said initiating of the new setup message initiates the call to connect to the Internet Service Provider for access to the Internet.

10. An apparatus for processing a call from a calling party without accepting the call and subsequently initiating a call to the calling party comprising:

a receiver for receiving an incoming signal to commence establishing a communication link with the calling;

a processor coupled to said receiver for identifying an attempt by the calling party to initiate a connection to establish the communication link and terminating an attempt to establish the communication link by the calling party;

a dialer coupled to the processor for automatically calling the calling party to establish the communication link with the calling party in response to the calling party's earlier attempt to establish the communication link.

11. The apparatus of claim 10 wherein the communication link is utilized for transferring digital information.

12. The apparatus of claim 11 wherein said processor further initiates a disconnect message to terminate the attempt to establish the communication link.

13. The apparatus of claim 12 comprises a router.

14. The apparatus of claim 12 comprises a router which is utilized to couple a computer user to an Internet Service Provider.

15. In an Integrated Services Digital Network, ISDN, where a computing device is coupled to the ISDN for processing of digital information which is transferred over the ISDN, an apparatus for interfacing the computing device to the ISDN to process a call from a calling party without accepting the call and subsequently initiating a call to the calling party in response to an attempt by the calling party to establish an ISDN connection comprising:

a receiver for receiving an incoming signal to commence establishing a communication link with the calling;

a processor coupled to said receiver for identifying an attempt by the calling party to initiate a connection to establish the communication link and terminating an attempt to establish the communication link by the calling party;

a dialer coupled to the processor for automatically calling the calling party to establish the communication link with the calling party in response to the calling party's earlier attempt to establish the communication link.

16. The apparatus of claim 15 wherein said processor further initiates a disconnect message to terminate the attempt to establish the communication link.

17. The apparatus of claim 16 comprises a router.

18. The apparatus of claim 16 comprises a router which is utilized to couple a computer user to an Internet Service Provider.

19. The apparatus of claim 16 wherein the ISDN operates under a CCITT Q.931 protocol.

* * * * *